Oct. 18, 1949.  G. B. HILL  2,484,890
BALING PRESS

Filed Dec. 17, 1943  9 Sheets-Sheet 1

INVENTOR.
GEORGE B. HILL
BY
ATTORNEYS

Oct. 18, 1949.　　　G. B. HILL　　　2,484,890
BALING PRESS
Filed Dec. 17, 1943　　　9 Sheets-Sheet 2

INVENTOR.
GEORGE B. HILL
ATTORNEYS

Oct. 18, 1949.                    G. B. HILL                    2,484,890
                                 BALING PRESS
Filed Dec. 17, 1943                                         9 Sheets-Sheet 3

INVENTOR.
GEORGE B. HILL
BY
ATTORNEYS

Oct. 18, 1949.  G. B. HILL  2,484,890
BALING PRESS
Filed Dec. 17, 1943  9 Sheets-Sheet 4
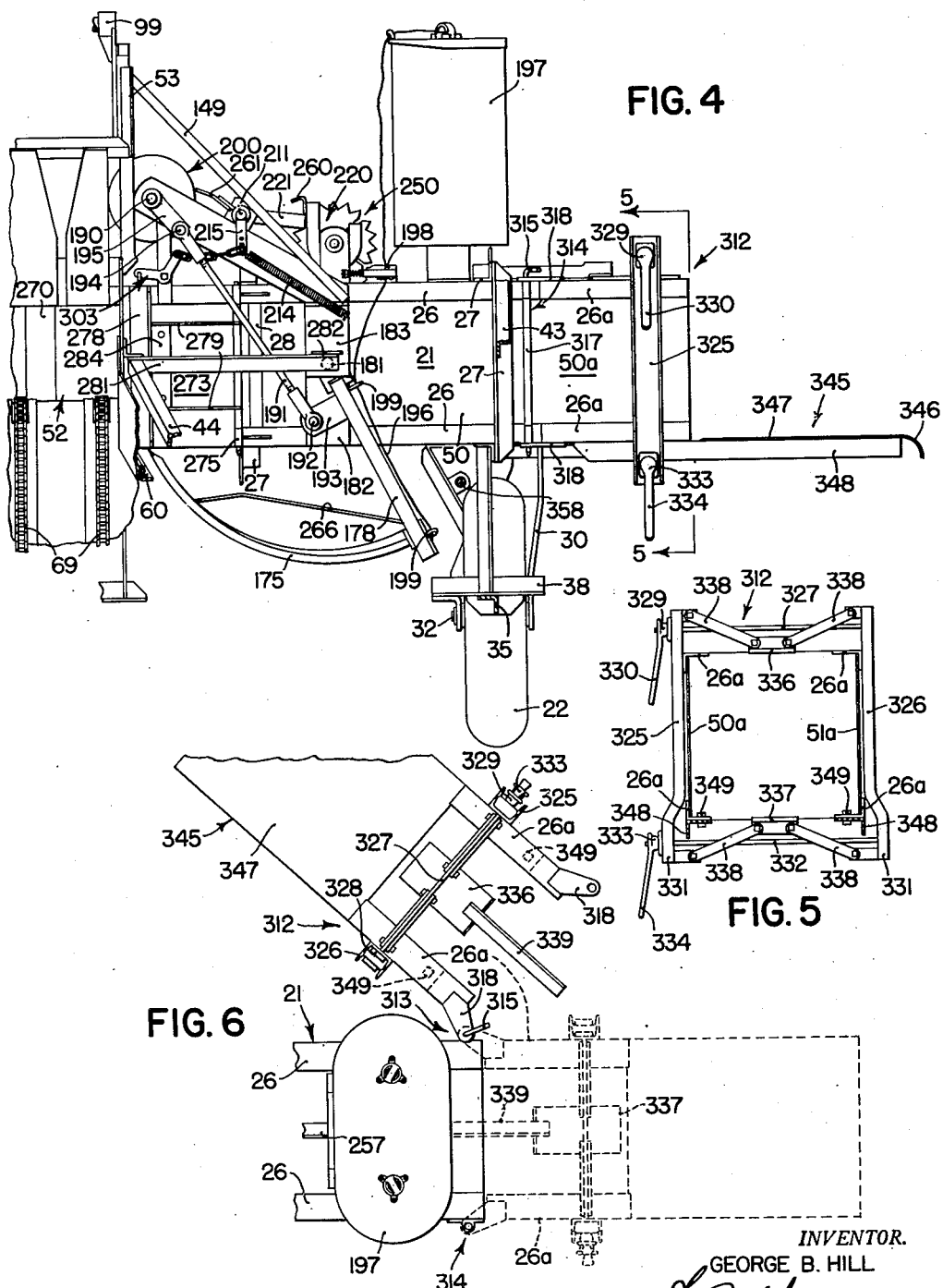

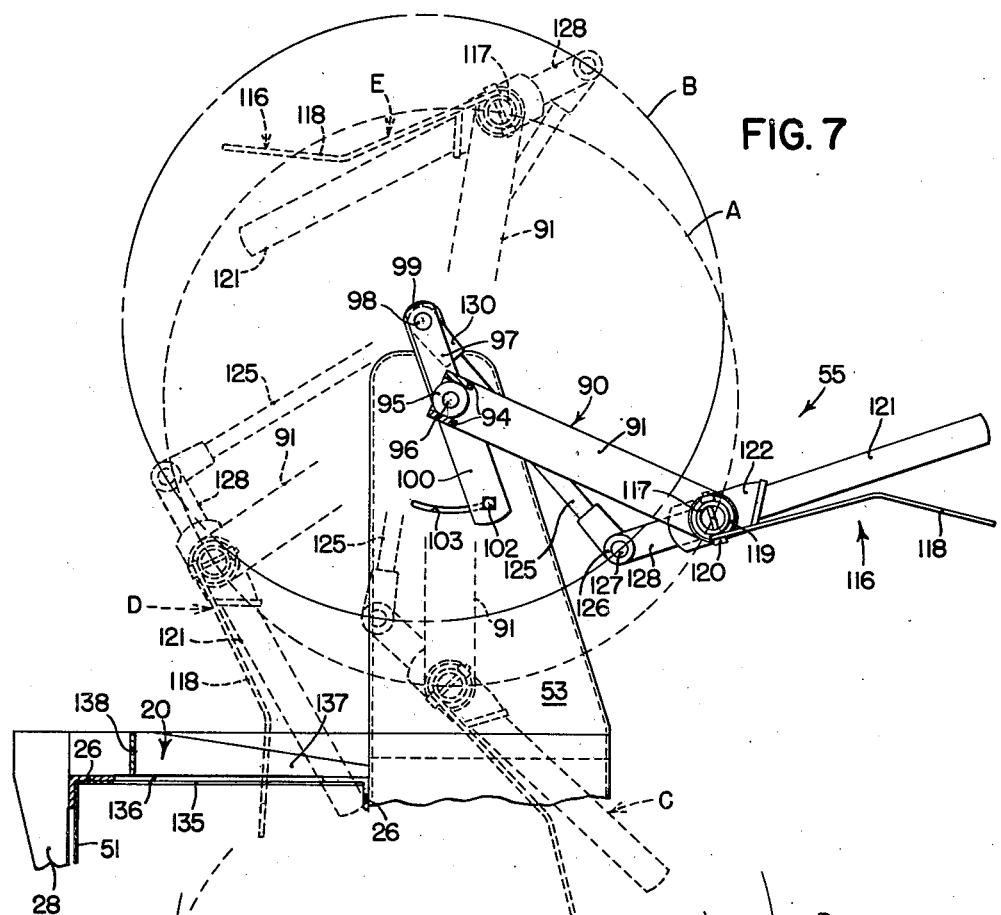

Oct. 18, 1949.　　　　　G. B. HILL　　　　　2,484,890
BALING PRESS
Filed Dec. 17, 1943　　　　　　　　　　　　　9 Sheets-Sheet 6
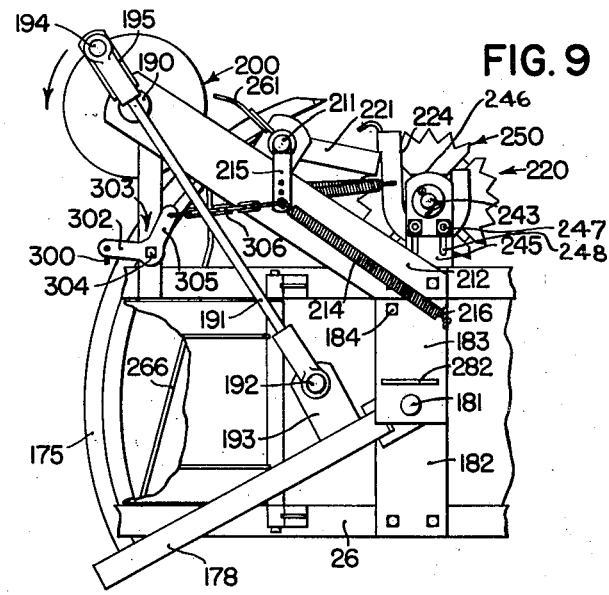
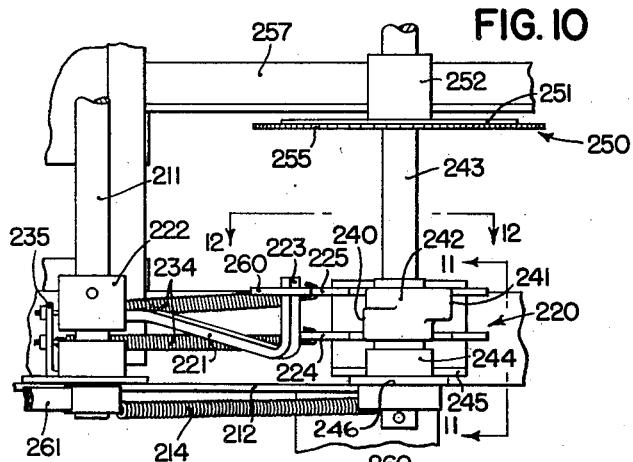
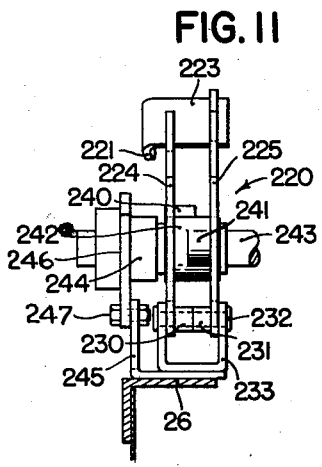
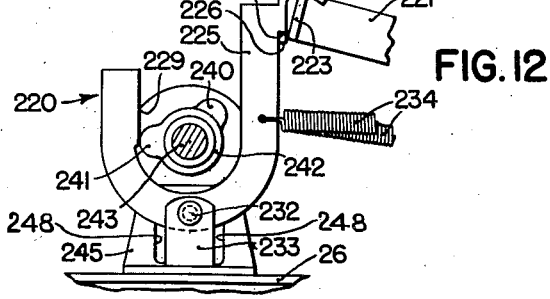
INVENTOR.
GEORGE B. HILL
ATTORNEYS Oct. 18, 1949.  G. B. HILL  2,484,890
BALING PRESS
Filed Dec. 17, 1943  9 Sheets-Sheet 7

INVENTOR.
GEORGE B. HILL

ATTORNEYS

Oct. 18, 1949.                    G. B. HILL                    2,484,890
                                  BALING PRESS
Filed Dec. 17, 1943                                       9 Sheets-Sheet 8

INVENTOR.
GEORGE B. HILL

ATTORNEYS

Oct. 18, 1949.  G. B. HILL  2,484,890
BALING PRESS
Filed Dec. 17, 1943  9 Sheets-Sheet 9
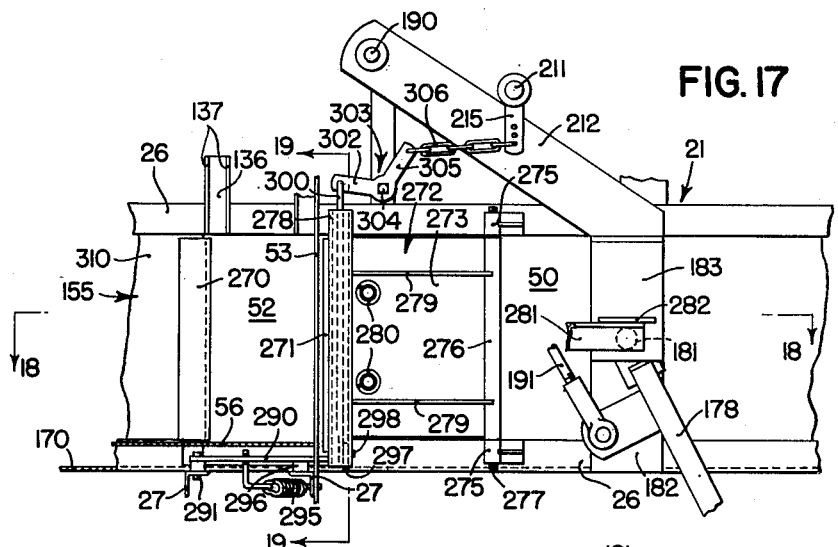
FIG. 17
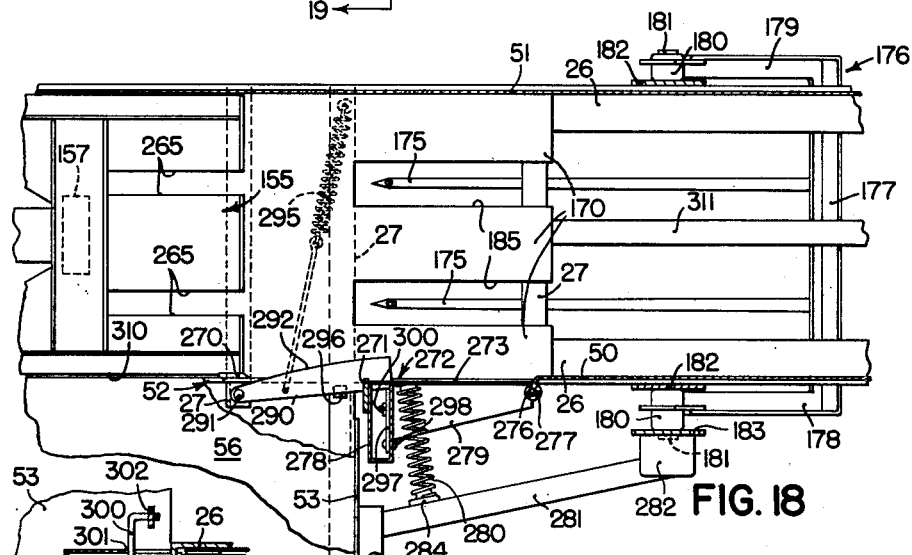
FIG. 18
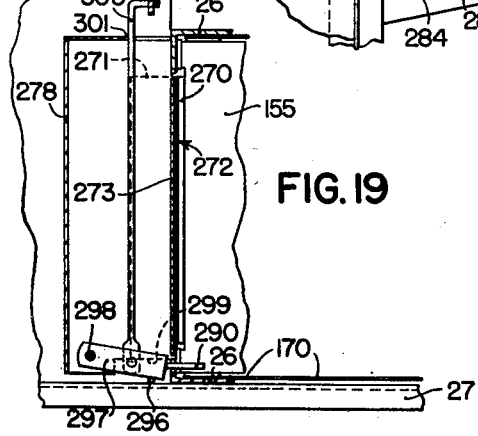
FIG. 19
*INVENTOR.*
GEORGE B. HILL
BY 
ATTORNEYS Patented Oct. 18, 1949

2,484,890

UNITED STATES PATENT OFFICE 2,484,890

BALING PRESS

George B. Hill, Ottumwa, Iowa, assignor to Deere Manufacturing Co., a corporation of Iowa Application December 17, 1943, Serial No. 514,707

17 Claims. (Cl. 100—20)

The present invention relates generally to baling presses and has for its principal object the provision of a novel and improved baling press of the type which picks up a windrowed crop, feeds the crop material into the press, automatically ties each bale when it reaches the desired size, and finally discharges the tied bales, no operator being required in attendance except for the operator who drives and steers the tractor or other draft device along the windrow.

A further object relates to the provision of means for severing the material at the feed opening in the bale case. Some operators prefer that the material be severed at each stroke of the baling head or plunger in order that the bale is thus formed of slices of baled material and readily falls apart when the bale ties are removed, after which the material can be handled in sections or slices. Other operators prefer not to slice up the material but to press the material into a bale in such a way that the bale tends to hold itself together, even after the ties are removed. In this case, however, it is desirable to sever the material at the time one bale is tied and the next one started, in order to make a clean separation between the bales. A further object of the present invention, therefore, relates to the provision of a severing mechanism which can optionally be set to sever the material at each stroke of the plunger, or set to cut the material only at the time of tying the bale. A related object has to do with the provision of a control means responsive to the actuation of the tying mechanism for causing the severing mechanism to cut the material at the feed opening.

Still another object of the present invention relates to the provision of an automatic mechanism for tying the bales after they are formed, thereby eliminating the necessity for additional operators to tie the bales by hand in a conventional manner. A related object has to do with mechanism which places the bale ties around the bale in planes parallel to the plane in which the material has been severed at the feeder opening. This is particularly advantageous in the case where the material is cut at each stroke of the baling plunger, so that the bale ties do not pass over the severed ends of the hay or straw or other material in the bale. This makes it easier to handle the bale, since the hands when grasping the bale ties, are not subjected to scratching by the sharp ends of the stems.

A further object of the present invention relates to the provision of a baler in which the plunger is not required to hesitate during the tying of the bale, thus simplifying the driving mechanism. In the accomplishment of this object, the plunger head is recessed to permit it to move into and out of contact with the bale while the tying needles are operating over the end of the bale. The recesses are adapted to receive the needles, sufficient clearance being provided so that the plunger head does not engage the needles and therefore no close synchronization is necessary between the plunger head and the needles, and furthermore it is not necessary to stop the plunger head while the needles are being actuated.

Still a further object relates to the provision of a novel and improved control mechanism for initiating the operation of the tying device, responsive to the bale attaining a predetermined size. Devices for measuring the length of bales are not new in themselves, and usually take the form of a toothed wheel which engages the side of a bale and initiates a control operation after rotating a full revolution. A specific object of the invention relates to the provision of a novel tripping mechanism responsive to the measuring wheel, for tripping the control element of the tying mechanism. A related object has to do with providing means for insuring that the tripping mechanism operates only once at the end of each bale, making it impossible for a condition to arise in which the tying mechanism could be caused to immediately repeat its actuation. This difficulty of a double tying actuation could be encountered in conventional tripping devices in which the measuring wheel merely releases a latch dog which allows the tripping member to move to its actuating position. Then, in case the feeding of material to the bale case were to be interrupted at this time, the measuring wheel would not be rotated any further and therefore the latch dog would be retained in its retracted position, thereby allowing the tying mechanism to repeat its tying actuation. In the accomplishment of this object, a pair of latch dogs are provided, one of which is released at some intermediate point during the formation of a bale, allowing the tripping member to move into engagement with the second latch dog, which is released by the measuring wheel at the end of the bale forming operation. After a single tying actuation, the tripping member is engaged by the first latch dog, which of course has had sufficient opportunity to be returned to its detaining position during the formation of the last part of the bale.

These and other objects and advantages of the present invention will be apparent to those skilled in the art after a consideration of the following description, in which reference is had to the drawings appended hereto, in which Figure 1 is a plan view of a windrow pick-up baling press with completely automatic tying mechanism.

Figure 4 is a partial front elevational view showing the right-hand portion of the machine.

Figure 5 is a sectional elevational view taken along a line 5—5 in Figure 4.

Figure 6 is a plan view showing the outer end of the baling case with the compression chamber swung rearwardly into transport position.

Figure 7 is a sectional elevational view taken through the feeding mechanism and the bale case along a line 7—7 in Figure 1, showing in broken lines, various positions of the feeder in its cycle of movement, and drawn to an enlarged scale.

Figure 8 is a sectional view similar to Figure 7 but showing the feeder in another position of adjustment, in which the feeder fork travels through a greater portion of the width of the bale case.

Figure 9 is a fragmentary front elevational view similar to a portion of Figure 4, but showing the needles raised in tying position.

Figure 10 is a plan view drawn to an enlarged scale of the device which measures the length of the bale and actuates the tying mechanism when the bale has reached the proper length.

Figure 11 is a sectional elevational view taken along a line 11—11 in Figure 10.

Figure 12 is a sectional elevational view taken along a line 12—12 in Figure 10.

Figure 1:
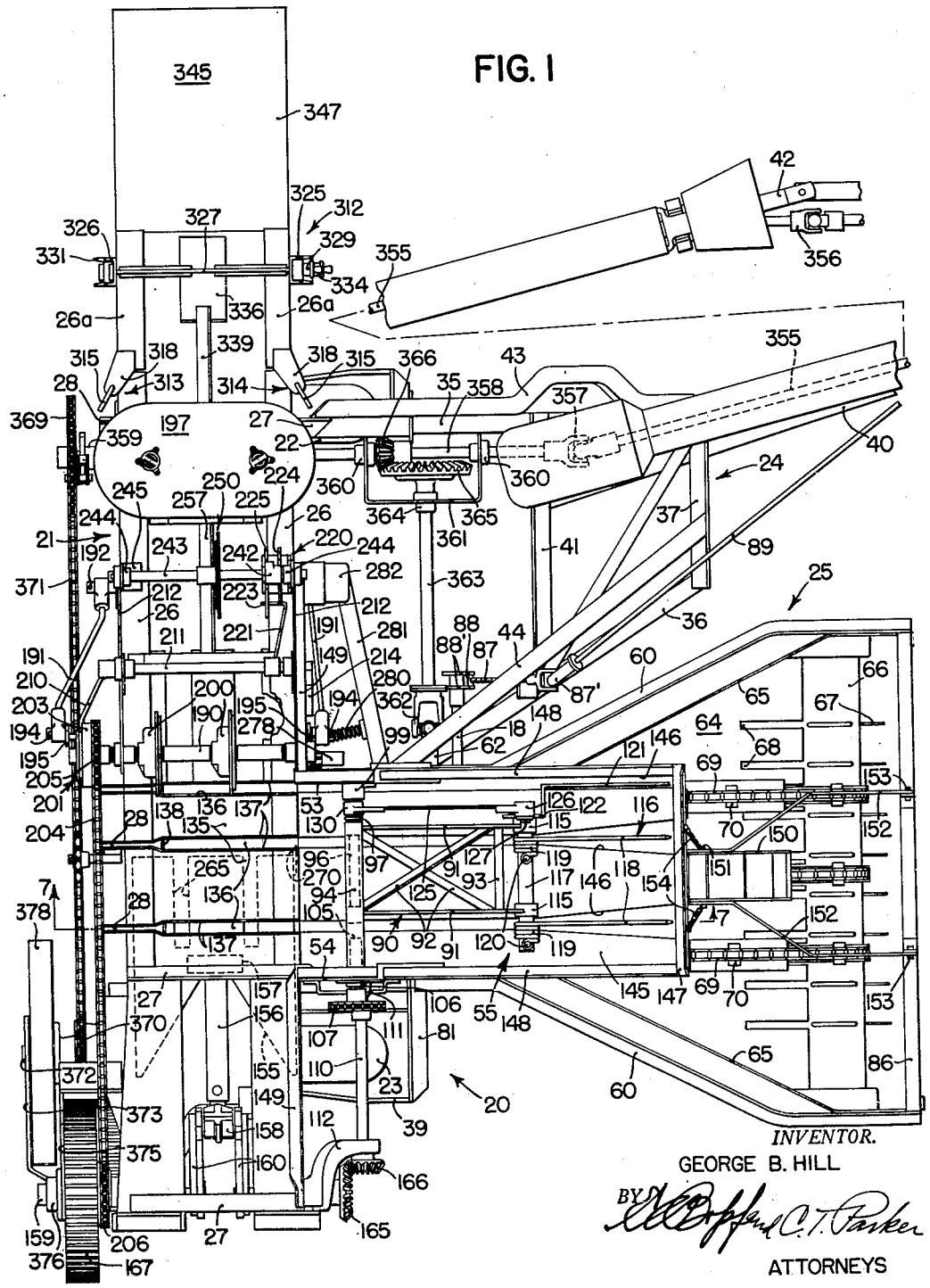

Figures 13-16, inclusive, are front elevational views of the measuring and tripping mechanism, showing the latter in four positions of its operating cycle and drawn to an enlarged scale.

Figure 17 is a front elevational view of a portion of the bale case, showing the feed opening and the device for severing material fed through the opening.

Figure 18 is a plan view taken in section along a line 18—18 in Figure 17.

Figure 19 is a sectional elevational view taken along a line 19—19 in Figure 17.

Referring now to the drawings, the automatic pick-up press is indicated in its entirety by reference numeral 20 and comprises, in general, a transversely disposed bale case 21 mounted on a pair of laterally spaced supporting wheels 22, 23, on which it is drawn forwardly by means of a draft member 24 extending forwardly from one side of the machine, while a pick-up device 25 extends forwardly from the other side of the machine for picking up windrowed crops and feeding them to the bale chamber, as will be explained.

The bale case 21 is rectangular in cross section and comprises four structural angle members 26 disposed tranversely of the direction of advance and defining the corners of the bale case. The angle members 26 are tied together by suitable horizontal and vertical frame members 27, 28 to form a rigid structure.

The bale case is mounted on the wheels 22, 23 by means of depending supports 30, 31, respectively, on which the axles 32, 33 of the wheels are mounted. The supports 30, 31 are in the form of U-shaped structural members, which also serve to tie the front and rear lower angle members 26 together. It will be noted in Figure 2 that the wheels are mounted beneath the bale case and slightly forwardly of the transverse center line thereof, whereby the weight of the machine is nearly balanced on the axles, the latter being sufficiently spaced behind the center of gravity so that the forward end of the draft member 24 always imposes a nominal load on the drawbar of the tractor, on which it is supported, so that there is never any tendency when travelling up-hill, to exert a lifting force on the tractor.

The draft frame 24 comprises a pair of structural beams 35, 36 connected together by a transverse frame member 37 at their forward ends and diverging rearwardly therefrom. The beam 35 is connected at its rear end to a U-shaped frame member 38, the latter being disposed substantially horizontally and straddling the wheel 22 to interconnect the two depending supports 30 at opposite ends of the angle 32. The beam 36 is connected to a similar U-shaped frame member 39, which interconnects the supports 31 on opposite sides of the wheel 23. A draft tongue 40 is secured to the transverse member 37 and to a second transverse member 41 spaced rearwardly thereof, and the tongue extends forwardly and is provided at its forward end with a hitch device 42, by means of which the tongue is connected to and supported on the drawbar of a tractor. The draft frame 24 is braced against vertical displacement relative to the bale case 21 by means of a pair of diagonal bracing members 43, 44, which are bolted to the upper portion of the bale case at laterally spaced points and converge forwardly and downwardly and are fixed at their forward ends to the transverse frame member 37.

The front and back walls of the bale case 21 comprise vertical metal sheets 50, 51, respectively, supported between the upper and lower main structural members 26. In the front of the bale case is provided a feed opening 52, best shown in Figures 4 and 17. A pair of vertical walls 53, 54 extend forwardly from the bale case on opposite sides of the opening to serve as lateral guides for material being fed to the opening 52, and the walls extend upwardly above the bale case for the purpose of supporting a feeder, indicated generally by reference numeral 55, which will be described in detail later. A floor plate 56 extends horizontally between the walls 53, 54 along the lower edge of the opening 52, over which the feeder 55 is adapted to sweep the material to be baled. The material is delivered to the floor plate 56 by means of a pick-up device 25 in the form of a harvester platform, which is mounted on the walls 53, 54 and extends forwardly and downwardly therefrom. The harvester platform 25 comprises a supporting frame 60 having a pair of laterally spaced brackets 61 (see Figure 2) which are journaled on a transverse shaft 62, the latter being journaled for rotation in bearings 63 fixed to the side walls 53, 54. The details of the platform are fully disclosed and claimed in my Patent No. 2,347,907, issued May 2, 1944, and therefore a detailed description here is not considered necessary. Briefly, the platform 25 comprises a floor plate 64 and forwardly diverging side walls 65 and a pick-up cylinder 66, mounted transversely across the forward end of the platform and having crop engaging fingers 67 which rotate upwardly and rearwardly, laying the harvested crop upon the floor plate 64, the latter being slotted at 68 to receive the pick-up fingers 67. The cylinder 66 is driven by a plurality of chains 69, which extend upwardly over the floor plate 64 from the cylinder 66 and have crop engageable fingers or lugs 70 for moving the crops received from the pick-up cylinder 66 upwardly and rearwardly over the floor plate 64 and delivering the crops to the floor plate 56 at the mouth of the feed opening 52. At the upper end of the platform 25, the chains 69 are trained over a plurality of sheaves or pulleys 71, which are fixed to the shaft 62 and are driven thereby. The chains 69 return beneath the floor plate 64 to the pick-up cylinder 66.

The platform 25 is counterbalanced by a pair of tension springs 75 connected to a transverse frame member 76, which is fixed to the draft member 36 and to the frame member 38. The springs 75 are connected to a pair of vertically disposed lever arms 77, respectively, which are pivotally mounted at 78 on brackets 79 attached to vertical legs 80, which extend downwardly from the two side walls 53, 54 and are mounted on a transverse frame member 81, which is supported at its outer end on the U-shaped frame member 39 and extends laterally inwardly to the draft member 36. The lower ends of the lever arms 77 are pivotally connected to horizontal links 82, which extend forwardly to pivots 83 on a transverse frame member 84 which interconnects the rear sides of a pair of laterally spaced ground engageable runners 85.

The runners 85 and side walls 65 are interconnected by an upwardly arched bracing member 86. The platform 25 is raised and lowered about the axis of the shaft 62 by means of a threaded rod 87 which is threaded into a trunnion nut 88 supported between a pair of spaced arms 88' fixed to the transverse shaft 78 on which the lever arms 77 are fixedly mounted. The threaded shaft 87 is rotated by means of a control shaft 89 connected to the shaft 87 through a universal joint 87'. The shaft 89 extends forwardly to a suitable support 89' on the draft tongue 40 and is provided with a suitable handle for rotating the shaft 89, thereby screwing the threaded shaft 87 into or out of the nut 88.

The feeder to be described below forms the subject matter of my copending application, Serial No. 577,579, filed February 12, 1945, and is issued on March 15, 1949, as Patent 2,464,684, and is illustrated and described in the present case merely as representative of one type of feeder that can be employed in conjunction with the present invention.

Figure 3:
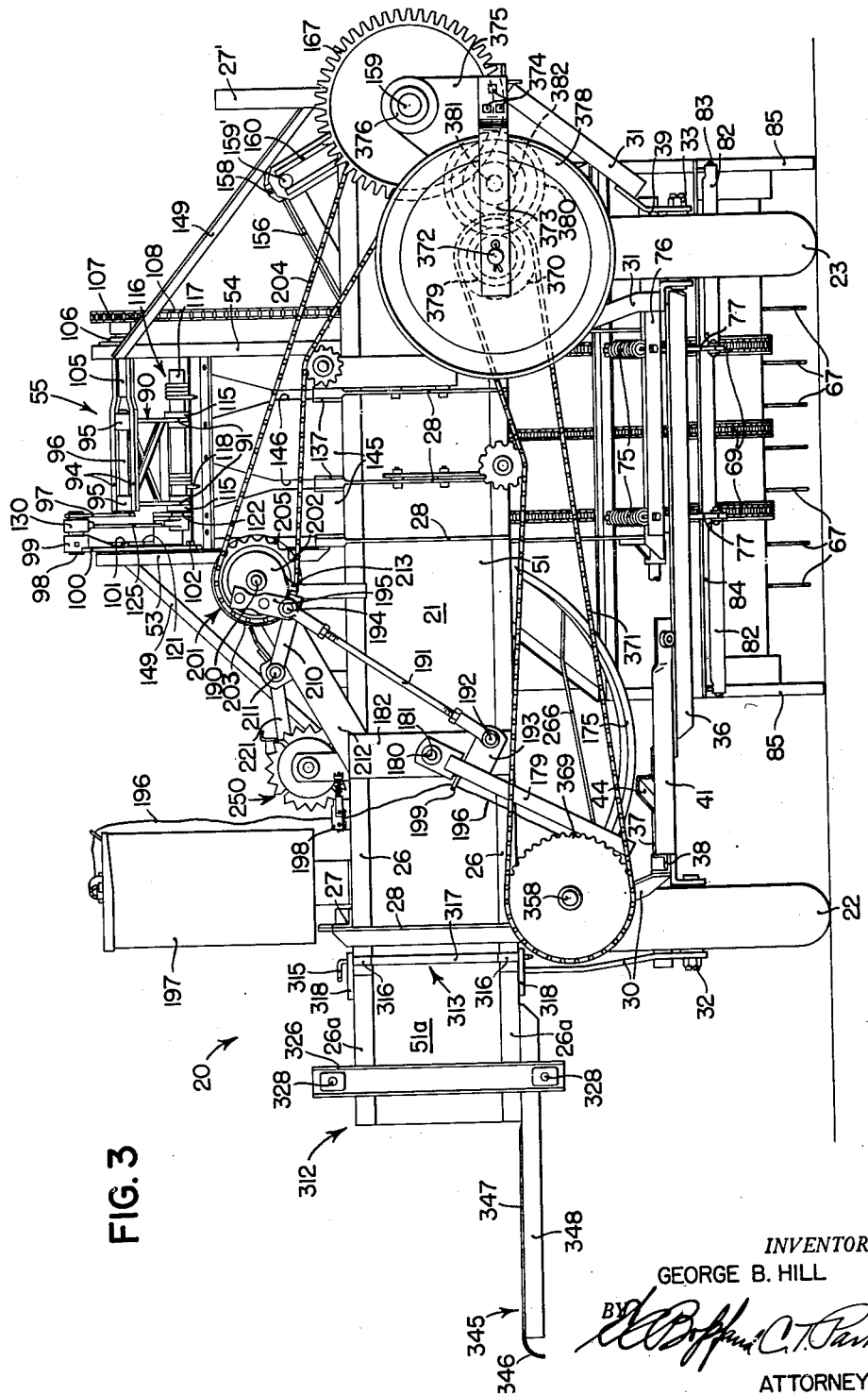
Figure 3 is a rear elevational view.

The feeder 55 comprises a frame 90 including a pair of laterally spaced arms 91 interconnected by crossed braces 92 and by a transverse brace 93. The arms 91 are rigidly mounted on a transverse support comprising a pair of spaced bars 94 as best shown in Figures 3 and 7. A pair of bearing sleeves 95 are rigidly mounted between the bars 94 and are disposed in axial alignment to receive a support shaft 96. The shaft 96 is rigidly fixed to the end of a supporting arm 97 at the inner end of the shaft 96. The arm 97 depends from and is fixed to a shaft 98 which is rigidly supported in a hub 99 carried on the upper end of a bracket arm 100 that is pivotally mounted on the vertical side wall 53 by means of a bolt 101 which is coaxial with the shaft 96 on which the feeder 90 is journaled. The pivoted arm 100 may be swung about the axis of the bolt 101 without shifting the position of the supporting shaft 96 except in angular movement about the axis thereof. The arm 100 can be rigidly fixed in adjusted position by means of a bolt 102 extending through the arm 100 and through an arcuate slot 103 in the side wall 53, the slot 103 being curved about the axis of the bolt 101 as a center. The purpose for this adjustment will be made apparent later.

The bars 94 converge slightly beyond the end of the supporting shaft 96 and are rigidly fixed to a stub shaft 105, as by welding, and the stub shaft 105 is journaled in a bearing 106 at the upper end of the side wall 54, extending therethrough to support a sprocket wheel 107 on the outer end of the shaft 105. The sprocket 107 is driven by a drive chain 108 which is trained around a second sprocket 109 fixedly mounted on a drive shaft 110, the latter being rotatably mounted in a bearing 111 fixed to the side wall 54 and a bracket 112, which is rigidly supported on one of the vertical frame members 28 of the bale case. Thus, by rotating the shaft 105 through the sprocket 107, the feeder arm 90 is swung about the axis of the shafts 96, 105 continuously, during operation.

The outer end of the feeder 90 is provided with a pair of laterally spaced bearing sleeves 115, fixed rigidly to the ends of the arms 91, respectively. A feeder fork 116 is supported in the bearing sleeves 115, and comprises a transverse shaft 117 journaled in the axially aligned bearing sleeves 115, and a pair of crop engaging tines or fingers 118, which extend from a pair of spring coils 119 encircling the shaft 117 and fixed thereto by bolts 120. A tucker arm 121 is carried in offset relation on a supporting arm 122 fixed to the shaft 117, the tucker arm 121 as well as the fingers 118, being adapted to engage the crops as they are carried rearwardly on the platform 25 by the chains 69 and feed the crops over the floor plate 56 into the feeder opening 52.

The angle of the feeder fork 116 relative to the feeder arm 90 is controlled by means of a connecting rod 125, on one end of which is mounted a bearing sleeve 126 which is journaled on a pin 127 carried on an arm 128, which is fixed to the fork shaft 117. The opposite end of the connecting rod 125 carries a journal bearing 130, which is journaled on the shaft 98 at the upper end of the arm 100.

Referring more particularly to Figures 7 and 8, it will be observed that as the feeder arm 90 swings in a circle about the axis of the shaft 96, the axis of the fork shaft 117 describes a circular arc about the axis of the supporting shaft 96, as indicated by the dotted line A in Figures 7 and 8. Since the axis of the shaft 98 is spaced from the axis of shaft 96, the outer end of the connecting rod 125, which is pivotally connected to the arm 128, describes a circular path about the axis of shaft 98, as indicated by the broken line B in Figures 7 and 8. Inasmuch as the arcuate paths A, B of the feeder fork shaft 117 and the pivot connection 127 between the connecting rod 125 and control arm 128, are offset from each other, the angle between the fork 116 and the feeder arm 90 changes continually throughout the cycle of movement. As shown in solid lines, the feeder fork 116 is moving downwardly over the platform and the fork is, at the same time, rotating in a clockwise direction about the axis of the shaft 117, until the feeder fork reaches its lowermost position substantially as indicated in dotted lines in position C, in which the lower ends of the fingers 118 are swinging over the floor plate 56. As the feeder arm 90 continues its movement upwardly, the connecting rod 125 is approximately parallel to the feeder arm 91 with the result that the feeder fork 116 is carried upwardly in a generally vertical position and is retracted lengthwise from the crop material within the bale case 20, thus avoiding entanglement with the crop material. In position D the arm is nearly withdrawn from the crop material within the bale case 20 and continues upwardly to the position indicated by E, in which the feeder fork 116 begins to rotate at accelerated speed in a clockwise direction about the axis of the shaft 117, the ends of the tines 118 swinging over the end of the arm 90 and into the position indicated in solid lines.

In Figure 7 the adjusting arm 100 is swung rearwardly to the limit of its extent of movement in a counterclockwise direction, with the securing bolt 102 moved to the forward end of the slot 103. In Figure 8, the arm 100 is swung to its limit of clockwise movement about the axis of the bolt 101 until the securing bolt 102 reaches the rear end of the slot 103. Inasmuch as the shaft 98 on which the connecting rod 125 is journaled is moved forwardly from position shown in Figure 7 to position shown in Figure 8, the lowered position of the feeder fork, indicated at C in Figure 8 is farther to the rear than the corresponding position in Figure 7 and hence the feeder fork travels over a greater portion of the width of the bale case 20 and is retracted therefrom in a position substantially closer to the back wall 51 of the bale case 20.

The arm 100 can be set in any position of adjustment between the two extreme positions shown in Figures 7 and 8 by merely loosening the molt 102 and swinging the arm 100 to the desired position. When the crop material is fed at a low rate by the platform conveyor chains 69 to the feeder fork 116, it is desirable that the feeder fork travel farther into the bale case 20 in order to distribute the crop material across the width of the bale case and closer to the back wall 51, rather than to merely carry the material to the feeder opening 52 and retract from the material at that point. However, on the other hand when the material is fed at a faster rate by the conveyor chains 69, such as when the windrows are thick and heavy, it is obvious that the feeder fork 116 engages a much larger mass of material, and at this time it is desirable that the fork should not travel as far across the bale case as in the previous instance. Hence, by setting the control arm 100 more nearly in the position indicated in Figure 7, the feeder fork can be retracted from the mass of material near the feeder opening 52 and thus does not crowd the heavy mass of material back against the rear wall 51, with the result that a better distribution across the bale case is thereby obtained.

A top plate 135 covers the bale case behind the feed opening 52 and extends from the front to the rear angle members 26. The top plate is provided with fore and aft extending slots 136 to receive the fork tines 118 and tucker arm 121 as they swing across the bale case, and the upper front angle member 26 is also slotted at these points. Reenforcing bars 137 are rigidly fixed, as by welding, to the top plate 135 and structural member 26 along each side of each slot 136 and are spaced apart by a spacing member 138 interconnecting the bars 137 at the rear ends of the slots 136. The bars 137 continue rearwardly and are joined to vertical braces 28 on the rear of the bale case.

Extending forwardly from the top of the bale case across the feeder opening 52 is a guide sheet 145 provided with longitudinally extending slots 146 disposed in fore and aft alignment with the slots 136 in the top of the bale case, for the purpose of receiving the fingers 118 and tucker arm 121 of the feeder fork 116, which project downwardly through the slots 146. The guide sheet 145 is curved forwardly and upwardly in order to compress the crop material fed to the feeder opening 52 by the conveyor chains on the platform 25. The guide sheet 145 also prevents material from entangling with the feeder arm 90 and with the connecting rod 125. The forward end of each slot 146 increases in width in order to insure that the fingers 118 do not interfere with the sheet 145, in case the fingers become slightly bent. The sheet 145 is mounted on a structural frame 147 and the forward end of the frame 147 is supported by upwardly and rearwardly inclined bracing members 148.

The upper ends of the side walls 53, 54 are braced against lateral displacement by laterally and downwardly inclined braces 149, the outer ends thereof being secured to the bale case.

The crops are held down on the conveyor chains 69 by means of a presser wheel 150 which is journaled on an axle 151 supported between a pair of arms or links 152, which extend forwardly in diverging relation and are pivotally connected by bolts 153 to the arched bracing member 86 across the forward end of the platform. The weight of the presser wheel 150 is sufficient to maintain the crops in engagement with the chains 69, the wheel being free to swing upwardly to ride upon the top of the windrow during operation. When there are no crops on the platform, the wheel rides on the center chain 69 and continues to be rotated by the lugs 70 of the chain 69 engaging the wheel, but the weight of the latter is carried on a pair of chains 154 which extend upwardly and are connected to the transverse member of the frame 147. The details of construction of the wheel itself do not form a part of the present invention, but are disclosed and claimed in application, Serial No. 442,256, filed May 8, 1942, by Hill and Jones, which issued February 19, 1946, as Patent 2,394,996, to which reference may be had for a detailed description.

Figure 2:
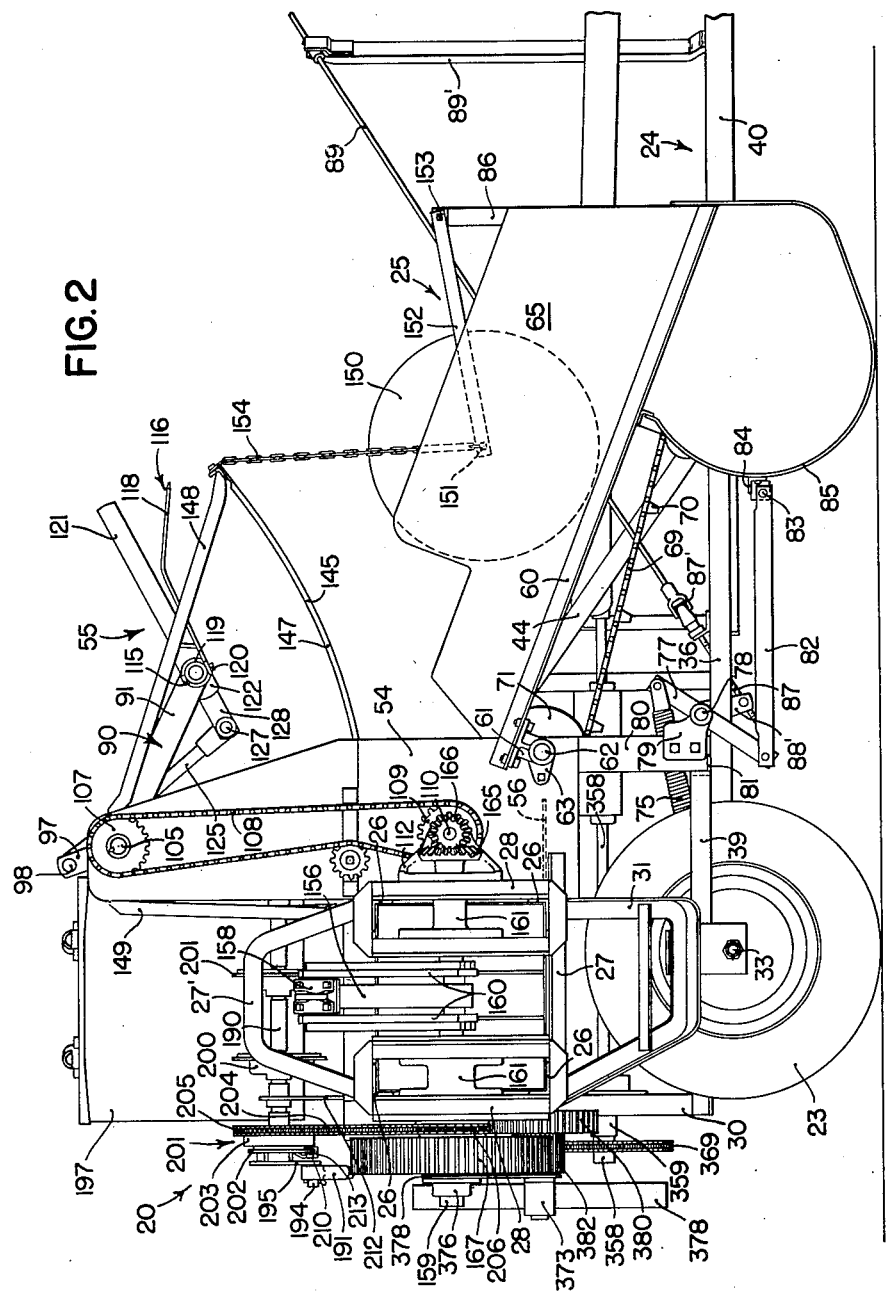
Figure 2 is a side elevational view of the right side of the machine.

Slidably disposed within the bale case 20 is a plunger comprising a head 155 and a connecting rod 156 connected to the head 155 by a suitable wrist pin 157. The other end of the connecting rod 156 carries a connecting rod bearing 158, within which is journaled a crank of a crankshaft 159. The crank 159' (Figure 3) is carried on a pair of crank arms 160. The crankshaft 159 is journaled in a pair of axially spaced bearings 161, each of which is mounted on the frame of the bale case. The front and rear portions of the bale case are interconnected by a fore and aft extending frame member 27' which arches over the path of movement of the crank, as best shown in Figure 2. The crankshaft 159 extends beyond the front and rear sides of the bale case and carries a bevel gear 165 on the forward end thereof, which meshes with a bevel gear 166 fixed to the end of the shaft 110, through which gears power is transmitted for driving the shaft 110 and therefore the feeder arm 90. A bull gear 167 is mounted on the rear end of the crankshaft 159. The bull gear 167 is rotated continuously by power transmitting means to be described later, thereby rotating the crankshaft 159 at a substantially constant rate of speed to reciprocate the plunger head 155 laterally within the bale case past the feed opening 52 to compress the crop material in the bale case at the opposite side of the feed opening. In this respect, the baling press operates in a conventional manner, gradually forcing the formed bale toward the left of the machine as material is compressed therein. The bale case is provided with a floor plate 170 behind the feed opening 52 and at a slightly lower elevation than the floor 56 in front of the opening 52.

After each bale is formed, it is tied by suitable tying mechanism, the details of which do not constitute an essential part of the present invention except as they cooperate with other mechanism as will be described hereinafter. The tying mechanism can be of the type which places a wire binding about the bale, or it can be a twine tying mechanism, and it is the latter type of mechanism that is used for the purpose of this disclosure.

The twine tying mechanism includes a pair of curved needles 175 disposed transversely of the direction of travel of the machine and beneath the bale case 21. As best shown in Figure 18, the needles are rigidly secured to a U-shaped support 176 comprising a supporting beam 177 extending fore and aft beneath the bale case, and mounted at opposite ends thereof, respectively, on a pair of supporting arms 178, 179 disposed in front and in the rear of the bale case, respectively. Each of the arms 178, 179 is provided with a hub 180, which are journaled on a pair of coaxial trunnions 181 mounted on a pair of vertical plates 182, which are fixed to the front and rear sides of the bale case and extend vertically between the two vertically spaced structural members 26. The front trunnion 181 is also supported at its outer end in a plate 183 which is bolted at 184 to the inner plate 182 above the trunnion 181 and extends forwardly and downwardly to its connection with the latter. The needles 175 are curved in an arc about the fore and aft extending axis of the trunnions 181 and are swingable upwardly through slots 185 in the floor plate 170.

The needles 175 are swung upwardly about the axis of the trunnions 181 into tying position, illustrated in Figure 9, by power transmitted from a knotter shaft 190 through a pair of connecting rods 191, each of which is journaled on a stud 192, mounted on a crank arm 193, fixed to the needle supporting arms 178 and 179, on opposite sides of the bale case 21, respectively. The other ends of the connecting rods 191 are journaled on studs 194, which are mounted on crank arms 195 attached to and driven by the knotter shaft 190.

The details of the knotting mechanism are well known to those skilled in the art and are similar to the mechanism used on grain binders, corn binders and the like. Inasmuch as the details of this mechanism do not constitute any part of the present invention, a complete description thereof is not deemed necessary and will therefore be omitted for the sake of simplicity. Briefly, each of the needles 175 carries a strand of twine 196, which extends from a ball of twine in a container 197 on top of the bale case. The twine extends downwardly through a suitable tensioning device 198 through eyes 199 on the needle supporting arm, and through the associated needle, which is made hollow to receive the twine, as known to those skilled in the art. Each strand of twine extends upwardly from the point of the associated needle, around the compressed material which is being baled, and thence to a knotting device 200 mounted on the knotter shaft 190. Each needle 175 is associated with one of the knotting devices 200 and as the needle swings upwardly through the bale case, the point of the needle carries the twine upwardly along the end of the bale and the knotter ties the two ends of the twine together and severs the twine at the knot in a manner well-known to those skilled in the art. In the drawings, the knotting mechanisms 200 are merely shown in outline, no attempt being made to show any of the details of the mechanism.

The knotting operation is accomplished in one revolution of the knotter shaft 190. The shaft 190 is rotated by means of a conventional self-interrupting clutch mechanism 201 which is also a part of the conventional binder mechanism which is not being described here in detail, since any self-interrupting one revolution clutch can be adapted for this purpose. This type of clutch comprises inner and outer coaxially disposed members, the inner member 202 being mounted on the shaft 190 and the outer member 203 being journaled for rotation on the shaft 190. The outer member 203 is rotated continuously by means of a drive chain 204 which is trained over a sprocket 205, formed integrally with the outer member 203. The chain 204 is driven by a sprocket 206 mounted on the crankshaft 159 adjacent the bull gear 167. The clutch 201 is normally held inoperative by means of a trip lever 210 which is rigidly secured to a trip shaft 211, the latter being journaled for rotation about a fore and aft extending axis on a pair of supporting bracket plates 212, which are secured to the front and rear upper bale case frame members 26. These bracket plates 212 also rotatably support the knotter shaft 190. As best shown in Figure 3, the end of the trip lever 210 engages a latch dog 213 on the inner clutch member 202 and in this position, holds the latch dog 213 out of engagement with the constantly rotating outer member 203. The trip lever 210 can be swung away from the latch dog 213 downwardly in a clockwise direction as viewed in Figure 3 about the axis of the shaft 211, whereupon the latch dog 213 is urged by a suitable spring (not shown) to connect the inner and outer clutch members 202, 203 together, causing the knotter shaft 190 to be rotated thereby. At the completion of a revolution of the shaft 190 the trip lever arm 210 engages the latch dog 213, disconnecting the latch mechanism and retaining the inner clutch member 202 in its normal stationary position.

The lever arm 210 is urged out of retaining position by means of a tension spring 214 connected to an arm 215 at the opposite end of the trip shaft 211, the opposite end of the spring 214 being anchored to a lug 216 on the plate 183. However, the trip arm 210 is normally maintained in its retaining position by means of a latching device indicated in its entirety by reference numeral 220 and which will now be described.

The trip shaft 211 is provided with a holding arm 221, fixed to a hub 222, which is rigidly mounted on the trip shaft 211, as clearly shown in Figures 9-16, inclusive. The holding arm 221 has a transversely bent outer end 223, which is positioned to be engaged by shoulders 226, 227 on a pair of latch members 224, 225, respectively. The two latch members 224, 225 are U-shaped, one arm of which is provided with the shoulder 226 or 227, while the other arm is provided with a camming surface 228, 229, respectively, on its inner edge. The U-shaped latch members 224, 225 are provided with supporting hubs 230, 231, which are journaled in side by side relation on a pin 232, carried in a U-shaped bracket 233, which is fixed to the bale case and is best shown in Figure 11. Thus, the two latch members 224, 225 can be tilted about the axis of the bolt 232, to swing the shoulders 226, 227 into or out of engagement with the transverse end 223 of the holding arm 221. The latch members 224, 225 are urged into latching or holding position by means of a pair of tension springs 234, which are suitably anchored to a lug 235 on the frame.

The latch members 224, 225 are shifted out of holding position by means of a pair of cams 240, 241 integrally formed on a supporting hub 242, which is rigidly mounted on a control shaft 243. The shaft 243 is rotatably mounted in bearings 244, carried on plates 246 secured by bolts 247 to standards 245 which are mounted on the bale case 21. The standards 245 are provided with vertical slots 248 to receive the bolts 247 thus providing for adjusting the shaft 243 toward and away from the bale case 21. The shaft 243 is rotated by means of a measuring wheel 250 comprising a disk 251 carried on a hub 252, which is mounted on the shaft 243. The disk 251 is suitably apertured to receive supporting bolts 254, around the circumference thereof, on which bolts are mounted a plurality of toothed segments 255 having radially extending slots 256 to receive the bolts 254 and providing for radial adjustment of the segments 255 with respect to the disk 251. The segments 255 have notches or teeth in the outer circumference thereof, and the wheel is positioned between one of the corner beams 26 of the bale case and a center structural member 257, with the teeth of the segments 255 extending into the bale case in engagement with the bale being formed. As the bale is formed, it is pushed laterally outwardly, thereby rotating the wheel 250 and hence the shaft 243, causing the hub 242 to rotate the cams 240, 241 into and out of engagement with the camming surfaces 228, 229 of the U-shaped latch members 224, 225, respectively. Thus, the measuring wheel 250 determines the length to which each bale is formed and when a bale is completed, the cams 240, 241 cause the trip shaft 211 to be actuated to actuate the tying mechanism. Inasmuch as a complete revolution of the shaft 243 is required to measure the length of a single bale, it will be evident that the length of the bales formed can be controlled by increasing or decreasing the circumference of the measuring wheel 250. This is accomplished by adjusting the segments 255 inwardly or outwardly relative to the supporting bolts 254 and at the same time raising or lowering the bearing supports 246 to position the serrated edges of the segments 255 in engagement with the top of the bales.

Although but one latch member 224 is necessary to control the trip shaft 211, there is a serious disadvantage inherent in the use of a single latch member. It will be appreciated that since the measuring wheel 250 is rotated by the movement of the bale outwardly through the bale case, the speed of revolution of the shaft 243 is obviously comparatively slow, consequently it is difficult to construct and maintain a camming device which will swing the latch member 224 out of engagement with the holding arm 221 but will release the latch member quickly enough to engage the holding arm 221 after one actuation of the tying mechanism. In fact, since there is no means for propulsion of the wheel 250 except movement of the bale, it is evident that if at the time of tying the bale, the feeding of crop material be interrupted, there would be no rotation of the wheel 250 during that time, and therefore the latch member 224 would be indefinitely held out of engagement with the holding arm 221, whereupon the tying mechanism would repeat.

To eliminate this difficulty, the two latch members 224, 225 are provided, which are tripped at different times during the formation of a bale and therefore neither latch member is required to be relatched immediately after it has been shifted out of engagement with the holding arm 221.

Figure 13:
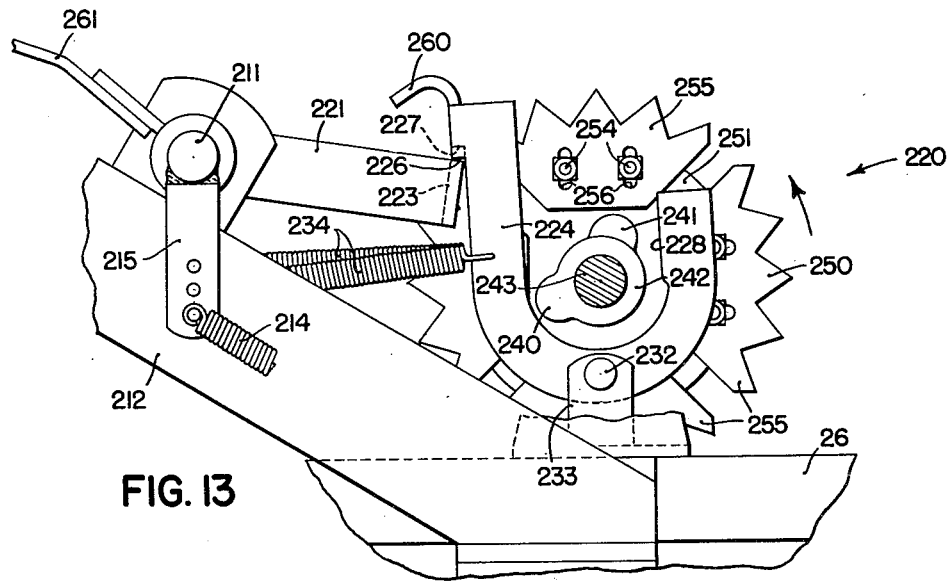
Figure 14:
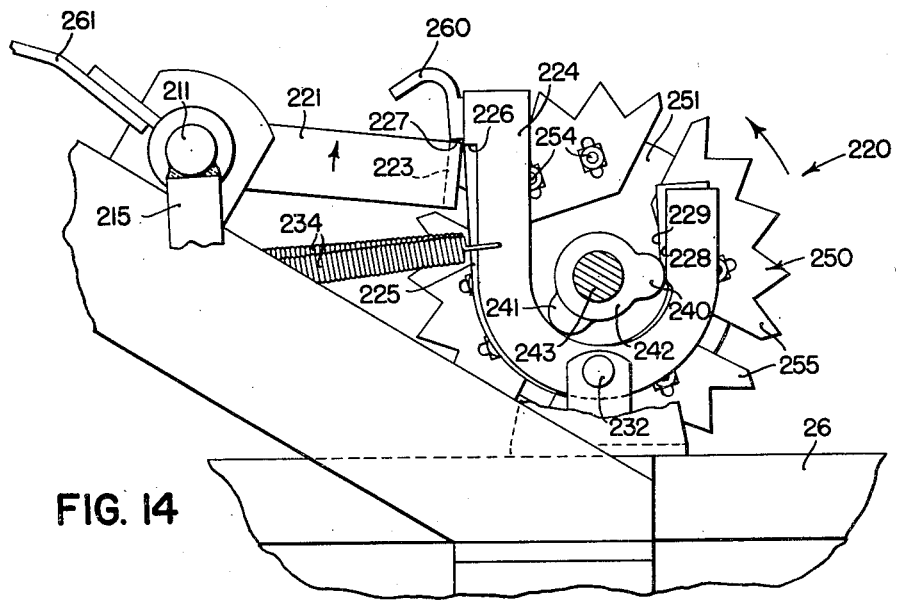

The operation of the control mechanism is as follows: Referring more particularly to Figures 13–16, inclusive, Figure 13 shows the position of the parts during a first step in the operation of forming a bale. Since neither of the cams 240, 241 is in engagement with the cam surfaces 228, 229, respectively, the springs 234 hold the latch members 224, 225 with their shoulders 226, 227 in engagement with the end 223 of the holding arm 221. The bale is moved toward the right by the strokes of the plunger head, causing the wheel to rotate slowly in a counterclockwise direction. It will be noted that the shoulder 226 on the latch member 224 is in a lower plane than the shoulder 227 on the latch member 225, therefore the end 223 of the holding arm 221 is engaged by the shoulder 226. Finally, the cam 240 moves around into engagement with the camming surface 228 of the latch member 224 and causes the latter to swing toward the right into the position shown in Figure 14, in which the shoulder 226 is disengaged from the arm 221, thereby allowing the spring 214 to swing the arm 221 upwardly against the shoulder 227 of the latch member 225. This small amount of movement, however, is not sufficient to trip the tying mechanism.

Figure 15:
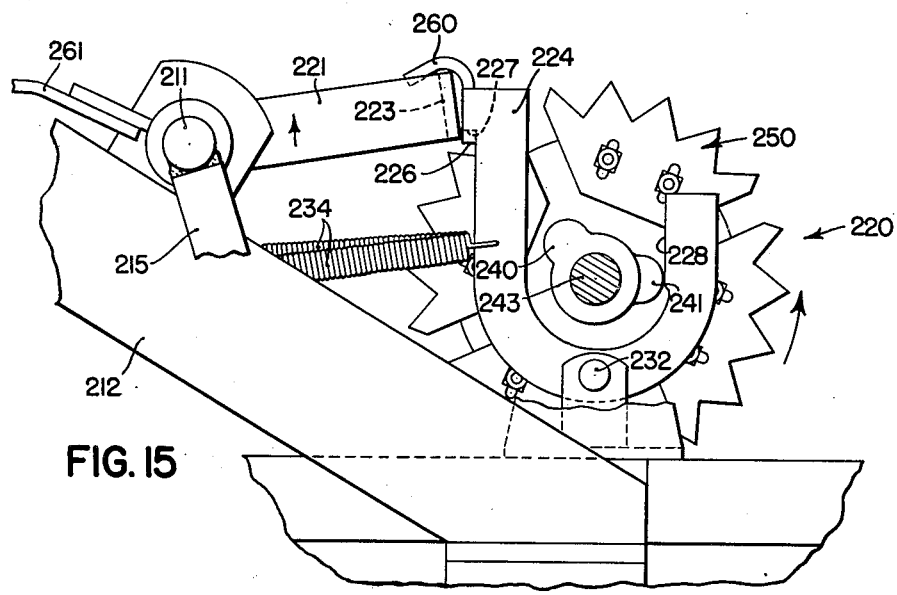
Figure 16:
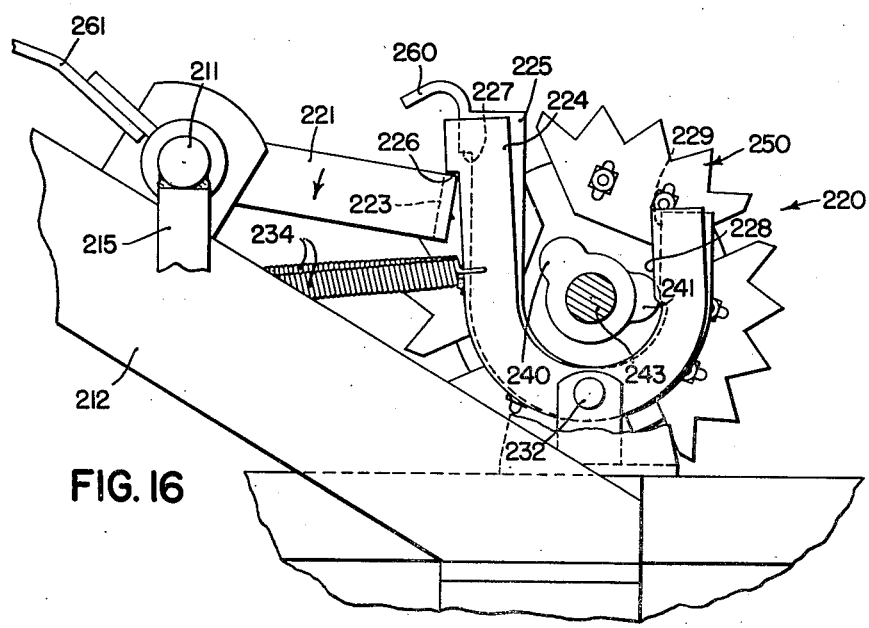

Further rotation of the measuring wheel 250 moves the cam 240 out of engagement with the camming surface 228, but since the arm 221 has moved over the end of the shoulder 226, the latter is prevented from reengaging the arm 221. After a still further movement of the bale, the other cam 241 is rotated into engagement with the camming surface 229, swinging the latch member 225 about the axis of the bolt 232 and disengaging the shoulder 227 from the holding arm 221. The spring 214 now swings the arm 215 and therefore the trip shaft 211 in a counterclockwise direction, whereupon the trip lever arm 210 is swung downwardly out of engagement with the latch dog 213. A hook 260, fixed to the end of the latch member 225, serves as a detent to limit the extent of upward swinging movement of the holding arm 221, since it is necessary to permit only enough movement to release the trip lever arm 210 from the dog 213. This position is illustrated in Figure 15 at the beginning of the tying operation. As the clutch 201 rotates the knotter shaft 190 through one revolution, the needles 175 are swung upwardly about the studs 181 by means of the crank arms 194 and the connecting rods 191. In this position of the trip shaft 211, a reset arm 261, which is rigidly mounted on the trip shaft 211, is swung downwardly into the path of movement of the crank arm 195. As the crank arm 195 swings upwardly in a counterclockwise direction, as viewed in Figure 4, to the intermediate position illustrated in Figure 9, it engages the reset arm 261, swinging the holding arm 221 downwardly beyond the edge of the shoulder 226 on the latch member 224, whereupon the spring 234 immediately swings the latch member 224 to lock the shoulder 226 over the top of the end 233 of the arm 221, as shown in Figure 16. At this time, the control shaft 243 has not been turned to disengage the cam 241 from the camming surface 229 and therefore the latch member 225 is entirely ineffective. Therefore, if it were not for the latch member 224, whose associated cam 240 is entirely out of contact with the camming surface 228, the trip shaft 211 would be free to be immediately returned to tripping position by the spring 214, thereby causing the tying mechanism to repeat. During the first part of the formation of the next bale, the control shaft 243 is rotated until the cam 241 disengages the camming surface 228, allowing the latch member 225 to return to its original position as shown in Figure 13.

Heretofore, it has been necessary to synchronize the reciprocative movements of the plunger head with the insertion of the needles through the bale case, either by causing the plunger head to hesitate at the opposite end of its stroke until the needles were withdrawn from the bale case, or to make the movement of the needles and actuation of the knotter mechanism so rapid that the entire actuation was completed between strokes of the plunger head, in order to avoid interference between the needles and the plunger head. In the present invention, this necessity for synchronization is eliminated by providing deep slots 265 in the end of the plunger head 155. The slots 265 are sufficiently wide enough to permit the plunger head to move into engagement with the end of the bale even at the time the needles are in their tying position. Obviously, it is also possible for the plunger head 155 to move away from the end of the bale with the needles in tying position.

Each of the needles 175 is provided with a presser bar 266 positioned as a chord across the arc of the needle 175. This presser bar tends to hold the material at the end of the bale in place while the bale is being tied.

In a baler of this type, in which division blocks are not used, it is desirable to slice the material as it is fed into the bale case, when terminating one bale and starting another, in order to provide a clean division between the bales. For this purpose, it is customary to install a vertical knife blade, as indicated at 270, along the forward corner of the plunger head 155 adjacent the feed opening 52. This knife blade 270 cooperates with a cutter bar 271 positioned along the vertical edge of the opening 52 adjacent the bale which is being formed. Heretofore, however, the cutter bar has been fixed in cutting position so that the material is severed at each stroke of the plunger, producing a bale formed of a plurality of slices of compressed crops or other material. This is considered by some operators to be a distinct advantage, for when the bale is opened the material readily falls apart and is easily handled for the purpose of feeding stock. This type of bale, however, has the disadvantage that should a bale tie break during shipment, the bale can no longer be handled as a unit. Therefore, in order to provide a baler which is adapted to make either the sliced or the solid type of bale, we have provided a mounting for the cutter bar 271 which permits the latter to be shifted away from cutting relation with the knife blade 270, with control means for automatically rendering the cutter bar ineffective during the formation of a bale, but causing it to cut the material at the time the bale is tied and the new bale is started. This automatic control mechanism is easily disconnected, however, so that when it is desired to form a bale of sliced material, it is a simple matter to cause the cutter bar to remain in cutting position during the entire baling operation.

Referring more particularly to Figures 4, 17, 18 and 19, the cutter bar 271 is mounted on a shiftable cutter bar member, indicated in its entirety by reference numeral 272 and comprising a hinged panel or door 273, hinged to the front wall of the bale case for outward swinging movement about a vertical axis. The hinge comprises a pair of hinge bearings 275, coaxially aligned on a vertical axis and secured to the upper and lower bale case members 26, respectively. A vertical tubular hinge bearing 276 is rigidly fixed, as by welding, along the vertical edge of the door 273 opposite the cutter bar 271 and a hinge pin 277 is inserted through the aligned hinge members 275, 276. A vertically extending tubular member or box 278 is fixed to the panel 273 alongside the cutter bar 271 for the purpose of supporting the cutter bar and also enclosing the control mechanism, as will be described. The box 278 is rigidly braced in position on the panel 273 by means of a pair of vertically spaced generally horizontal bracing plates 279.

The hinged cutter bar member 272 is resiliently urged into cutting position of the cutter bar 271 by means of a pair of vertically spaced compression springs 280 which bear against the outer face of the panel 273 and react against a horizontal beam 281, which is spaced forwardly of the cutter bar member 272 and is secured at one end to the side wall 53 adjacent the feeder opening and secured at its opposite end to a horizontal plate 282 which extends forwardly from the supporting plate 183 which carries the trunnion 181 of the needle carriage. A vertical bar 284 is fixed to the beam 281 and serves as an abutment for the two vertically spaced springs 280, which hold the box 278 in abutment with the bale case frame members 26, in which position the cutter bar 271 acts in cutting relation to the knife 270.

The cutter bar member 273 is swung outwardly about the hinge pin 277 at each stroke of the plunger head 155 by means of a camming plate 290 disposed horizontally beneath the feeder floor plate 56 and pivotally connected by a pivot bolt 291 on one of the transverse bale case members 27. The camming plate 290 has an inwardly inclined camming surface 292 which extends into the bale case and in a position to be engaged by the lower portion of the plunger head 155 as the latter moves toward the bale which is being formed. When the plunger head 155 engages the camming edge 292 of the plate 290, the latter is pushed outwardly from the bale case, and then upon the return stroke of the head 155, the plate 290 is returned into the bale case by means of a tension spring 295 connected between the plate 290 and a frame member 27 beneath the bale case. The movement of the camming plate 290 into the bale case is limited by a limit block 296 welded to the bottom of the plate 290 and slidable on the frame member 27 into engagement with the bale case frame member 26. Thus, as the plunger head 155 reciprocates within the bale case, the camming plate 290 reciprocates about the pivot axis 291. This reciprocative movement of the camming plate 290 is transmitted to the cutter bar member 272 by engagement with the end of a dog 297 disposed within the box 278 in the lower portion thereof and pivotally connected by a pivot bolt 298 to the side of the box 278, providing for vertical swinging movement, to swing the end of the dog 297 upwardly out of engagement with the cam plate 290. When the dog 297 is disposed in engagement with the plate 290, outward swinging movement of the latter about the pivot bolt 291 acts through the dog 297 and pivot bolt 298 to swing the box 278 and the entire cutter bar member 272 outwardly about the vertical axis of the hinge pin 277, thereby disabling the cutter bar 271 and preventing the knife 270 from cutting the material. The cutter bar 271 is rendered operative, however, by raising the dog 297 until it is disengaged from the plate 290, whereupon the latter merely shifts outwardly and the lower edge of the box 278 is relieved at 299 (see Figure 19), to permit the plate 290 to reciprocate without engaging the cutter bar member 272.

The dog 297 is controlled by means of a vertical link 300, which extends upwardly through the box 278 and through an opening 301 in the top of the box, and is swingably connected at its upper end to one arm 302 of a bell crank 303. The bell crank 303 is swingably mounted on a pivot bolt 304 on top of the bale case and has another arm 305, which is connected by a flexible chain 306 to the arm 215 on the trip shaft 211. It is evident, that when the trip shaft 211 is rocked in a counterclockwise direction as viewed in Figure 9 when the holding arm 221 is released by the tripping device 220, the arm 215 pulls through the chain 306 and bell crank 303 to lift the link 300 and thus raise the dog 297 out of engagement with the camming plate 290. Therefore, at the time the bale is tied the cutter bar member 272 is held in operative relation by the springs 280 to cooperate with the knife 270 in cutting the material which is being fed through the opening 52. After the trip shaft 211 is returned to normal position, the dog 297 drops to its normal position in engagement with the camming plate 290, after which the cutter bar is again shifted out of operative position at each stroke of the plunger head.

If for any reason, it is desired not to cut the material, it is a simple matter to disconnect the chain 306, thereby permitting the camming plate 290 to swing the cutter bar member 272 outwardly at every stroke of the plunger. On the other hand, if it is desired to cut the material at every stroke of the plunger during the entire operation, the bell crank arm 302 can easily be blocked or tied in raised position, which will hold the dog 297 out of engagement with the plate 290 throughout the entire operation of forming a bale, thereby resulting in a cutting relation between the knife 270 and cutter bar 271 at each stroke of the plunger.

It will be noted that the plunger head 155 has a solid side wall 310 adjacent the feed opening 52, which blocks off the feed opening as the plunger moves across the opening and into engagement with the bale, to prevent material from being fed into the opening at such time. As stated previously, the movement of the feeder fork is synchronized with the plunger so that it does not interfere therewith.

As best shown in Figure 18, the floor plate 170 within the bale case terminates approximately in alignment with the hinged edge of the panel 273 and from there on, the bale rests upon the horizontal flanges of the structural angle members 26 at the two lower corners of the bale case. A center supporting member 311 is also provided directly below the member 257, to hold the shape of the bale. At the end of the main portion of the bale case 21, is disposed a compression case or chamber 312, best shown in Figures 3–6, inclusive, which comprises a plurality of structural angle members 26a disposed in alignment with the bale case members 26, and having side walls 50a, 51a disposed in alignment with the side walls 50, 51 of the bale case. The compression case 312 is detachably connected to the end of the bale case 21 by means of a pair of vertically disposed hinges 313, 314, extending vertically along the front and rear corners of the end of the bale case. Each hinge joint comprises a hinge pin 315 extending vertically through vertically aligned tubular hinge bearings 316, 317 fixed to the bale case members 26 and to the rear edge of the walls 50a, 51a, respectively, and also through a pair of vertically spaced bracket plates 318, which are rigidly fixed to the upper and lower frame members 26a of the compression chamber 312. Normally, the compression chamber 312 is secured rigidly to the end of the bale case during operation, but can be removed by pulling the two hinge pins 315 upwardly out of the hinge bearings 313, 314. Usually, it is more convenient to merely remove the front hinge pin and swing the compression chamber 312 rearwardly about the axis of the rear hinge 313, as shown in Figure 6, in which position the overall width of the bailing press is not excessive for transport purposes.

Each of the front and rear walls 50a, 51a of the compression chamber 312 is provided with a vertically extending compression beam member 325, 326, respectively. The compression beams 325, 326 are each in the form of a structural channel member which is rigidly fixed, as by welding, to the side wall and frame members 26a of the compression chamber 312, and extend above and below the latter. The upper ends of the two compression beams 325, 326 are interconnected by means of a tie rod 327 which has a head 328 at one end and is threaded at the other end to receive a nut 329. The nut 329 has a handle 330 for the purpose of tightening and loosening the same.

The lower ends of the compression beams 325, 326 are offset outwardly at 331 and are provided with a tie rod 332 having a nut 333 at one end, operable by a handle 334. A pair of compression shoes 336, 337 are disposed above and below the center of the compression chamber, respectively. Each of the shoes 336, 337 is coupled to the adjacent ends of the upright compression beams 325, 326 by means of toggle links 338 disposed substantially horizontally but inclined slightly inwardly between the ends of the beams and the shoes, so that by moving the beams 325, 326 toward each other horizontally, the shoes 336, 337 are shifted toward each other in a vertical direction, thereby reducing the area of cross section of the compression chamber. This results in an increase in the amount of force necessary to push the bales through the compression chamber, which causes the plunger head 155 to pack the crop material more densely in the bale. The beams 325, 326 are adjusted closer together, by tightening the nuts 329, 333 by means of the handles 330, 334. Each of the shoes 336 is tied to the respective upper or lower central bale case frame member 257, 311, respectively, by means of a tie bar 339.

As the completed bales emerge from the end of the compression chamber 312, they are supported on a table 345 until they are clear of the compression case, after which they fall to the ground from the downwardly curved end 346 of the table 345. The table 345 comprises a generally horizontal sheet or plate 347 having a downwardly curved outer end 346 and the sheet is supported on a pair of structural angle members 348, which are disposed directly beneath the lower angle members 26a of the compression case 312 and are pivotally connected thereto by bolts 349, which permit the compression case members 26 to be squeezed inwardly by tightening the nut 333 on the tie rod 332. The angle members 348 rest on top of the tie rod 332 and slide relative thereto when the members 26a are drawn together. It is noted that the lower end 331 of the vertical members 325, 326 are offset outwardly to provide for movement toward each other without engaging the members 348.

Power is supplied for driving the various elements of the machine, through a power shaft 355 extending longitudinally along the draft frame 24 and having a suitable flexible power transmitting connection 356 of any conventional type, for connecting the power shaft 355 with the power take-off shaft of a tractor. The power shaft 355 is connected through a universal joint 357 with a drive shaft 358 mounted on the draft frame of the implement and which extends rearwardly beneath the bale case and is journaled in a plurality of bearings 359, 360, which are mounted on the wheel support frame 30 and on a U-shaped frame member 361 on the draft frame 24. The pick-up mechanism is driven from the shaft 62, as has been previously explained, which is connected through a universal joint 362 to a transverse shaft 363 journaled in a bearing 364, which is carried on the U-shaped frame member 361. A bevel gear 365 on the end of the shaft 363 meshes with a drive pinion 366, which is fixed to the drive shaft 358, from which power is obtained. The rear end of the last mentioned shaft carries a sprocket 369, which is connected through a chain 371 to a sprocket 370, which is mounted on a stub shaft 372, the latter being supported at one end on the lower bale case member 26 of the rear of the bale case and is carried at its outer end on a cantilever beam 373. The beam 373 is rigidly bolted at 374 to a supporting plate 375 which supports the rear bearing 376 for the shaft 159 of the bull gear 167. The shaft 372 also carries a flywheel 378 rearwardly of the sprocket 370 and rigidly connected thereto, and a pinion 379 (see Figure 3), which meshes with a countershaft gear 380 fixed to a countershaft 381 which is supported between the lower bale case member 26 and the plate 375. A countershaft pinion 382 is fixed to the countershaft 381 and meshes with the bull gear 167 on the crankshaft 159. Thus, the crankshaft 159 and the plunger head 155 connected thereto, are driven from the power shaft 358 through the chain 371 and the train of gears. Since the flywheel 378 is mounted on a comparatively high speed unit including the sprocket 370, the flywheel can be much smaller than if it were mounted on the crankshaft itself. It has been previously explained that power for driving the tying mechanism is taken from a sprocket 206 on the crankshaft through a chain 204, while power for driving the feeder mechanism is also taken from the crankshaft through the pair of bevel gears 165, 166, shaft 110, and chain 108. It will be evident that the baling press is entirely automatic, no operator being required except the driver of the tractor which pulls the implement. From his seat on the tractor, the operator controls only the height of the platform through the control rod 89 and has a clear and unobstructed view of the platform and feeding mechanism. Furthermore, by virtue of the transverse position of the bale case, the operator on the tractor also has a view of the tying mechanism and can see the twine 196 as it is fed from the top of the twine can 197 and therefore can tell when the twine needs replenishing. He can also easily observe the bales as they fall off the end of the table 345.

I do not intend my invention to be limited to the exact details shown and described herein, except as limited by the claims which follow.

I claim:

1. In a baling press, a bale case having a feed opening in a wall thereof, a plunger reciprocable within said case, a first cutting tool disposed along one side of said opening, a second cutting tool cooperative with said first cutting tool responsive to movement of said plunger for cutting off material being fed through said opening, means responsive to movement of said plunger for shifting said first cutting tool away from cutting relation with said second cutting tool to prevent cutting at certain times, and means for disabling said shifting means to cause said cutting tools to cut said material.

2. In a baling press, a bale case having a feed opening in a wall thereof, a plunger reciprocable within said case past said opening, a first cutting tool disposed along one side of said opening, a second cutting tool mounted on said plunger and cooperative with said first tool and actuated by movement of said plunger for cutting off material being fed through said opening, shiftable mounting means for one of said cutting tools providing for movement of the latter out of cutting position, means responsive to movement of said plunger for shifting said one tool, and means for disabling said shifting means to effect a cutting relation between said tools.

3. In a baling press, a bale case having a feed opening in a wall thereof, a plunger reciprocable within said case past said opening, a first cutting tool disposed along one side of said opening, a second cutting tool mounted on said plunger and cooperative with said first tool and actuated by movement of said plunger for cutting off material being fed through said opening, shiftable mounting means for one of said cutting tools providing for movement of the latter out of cutting position, means engageable by said plunger in every stroke for shifting said one tool out of cutting position, and means for periodically disabling said shifting means to effect a cutting relation between said tools.

4. In a baling press, a bale case having a feed opening in a wall thereof, a plunger reciprocable within said case past said opening, a cutting tool mounted on said plunger and movable therewith, a cutting member movably mounted at one side of said opening and cooperative with said plunger mounted tool to cut material being fed through said opening at each stroke of said plunger but shiftable out of cutting engagement, means engageable with said plunger at each stroke of the latter and having a connection with said cutting member for shifting the latter out of cutting engagement, and means for periodically disabling said connection to effect a cutting relation.

5. In a baling press, a bale case having a feed opening in a wall thereof, a plunger reciprocable within said case past said opening, a cutting tool mounted on said plunger and movable therewith, a cutting member movably mounted at one side of said opening and cooperative with said plunger mounted tool to cut material being fed through said opening at each stroke of said plunger but shiftable out of cutting engagement, spring means for yieldably holding said member in cutting engagement, camming means engageable with said plunger at each stroke of the latter, and a disconnectible connection between said camming means and said cutting member for optionally transmitting force therebetween to shift said member responsive to a stroke of said plunger.

6. In a baling press, a bale case having a feed opening in a wall thereof, a plunger reciprocable within said case past said opening, a cutting tool mounted on said plunger and movable therewith, a cutting member movably mounted at one side of said opening and cooperative with said plunger mounted tool to cut material being fed through said opening at each stroke of said plunger but shiftable out of cutting engagement, spring means for yieldably holding said member in said cutting engagement, a camming member shiftably disposed within said case and having a camming surface engageable with said plunger upon reciprocation of the latter causing said member to be forced outwardly of said case, and a dog normally disposed in a position in engagement between said camming member and said cutting member and so arranged and constructed that outward movement of said camming member acts through said dog to shift said cutting member out of cutting relation, said dog being shiftable out of said engaged position to prevent said cutting member from being shifted.

7. In a baling press, a bale case having a feed opening in a wall thereof, a plunger reciprocable within said case past said opening, a pair of cutting elements mounted on said plunger and on said case, respectively, and cooperable to cut off material being fed through said opening, one of said elements being shiftable to disabled position, mechanism for tying the bales, and means responsive to actuation of said tying mechanism for controlling said cutting elements to cause them to sever the material at completion of a bale.

8. In a baling press, a bale case having a feed opening in a wall thereof, a plunger reciprocable within said case past said opening, a pair of cutting elements mounted on said plunger and on said case, respectively, and cooperable to cut off material being fed through said opening, one of said elements being shiftable to disabled position, means connected with one of said elements for normally holding the latter in disabled position, mechanism for tying the bales, and means responsive to actuation of said tying mechanism for disabling said holding means permitting said element to be moved to cutting position for severing the material at the completion of a bale.

9. In a baling press, a bale case having a feed opening in a wall thereof, a plunger reciprocable within said case past said opening, a cutting tool mounted on said plunger and movable therewith, a cutting member movably mounted at one side of said opening and cooperative with said plunger mounted tool to cut material being fed through said opening at each stroke of said plunger but shiftable out of cutting engagement, means for yieldably holding said member in cutting engagement, camming means engageable with said plunger at each stroke of the latter, a disconnectible connection between said camming means and said cutting member adapted to shift said member responsive to each stroke of said plunger, mechanism for tying the bales, and means responsive to actuation of said tying mechanism for disconnecting said connection to permit said spring means to hold said cutting member in cutting position for severing the material at the completion of a bale.

10. In a baling press, a measuring device for determining the size of the formed bales, mechanism operative through a cycle for terminating the formation of one bale and initiating the formation of a succeeding bale, means for controlling an actuation of said mechanism, including a pair of independently actuable control elements, said mechanism being so arranged and constructed that manipulation of both elements is required to effect an actuation of said mechanism, and means responsive to said measuring device for independently manipulating said elements at spaced intervals.

11. In a baling press, a measuring device for determining the size of the formed bales, mechanism operative through a cycle for terminating the formation of one bale and initiating the formation of a succeeding bale, means responsive to said device for controlling an actuation of said mechanism, said means comprising a trip member, a pair of latch dogs biased for engagement with the latter, means for releasing one of said dogs responsive to the partial formation of a bale, means responsive to the formation of a bale of predetermined size for releasing the other of said dogs, and means responsive to actuation of said mechanism for restoring at least one of said dogs to latched position.

12. In a baling press, a measuring device for determining the size of the bale being formed, binding mechanism for securing said bale, means responsive to said measuring device for actuating said mechanism when a bale reaches a predetermined size, said means comprising a trip member, a pair of latch dogs biased for engagement with the latter, means for releasing one of said dogs responsive to the partial formation of a bale, permitting said trip member to move into engagement with the other of said dogs, means responsive to the formation of a bale of predetermined size for releasing said other dog thereby effecting an actuation of said binding mechanism, and means responsive to actuation of said mechanism for restoring said trip member to its original position in latched engagement with said one dog.

13. In a baling press, a measuring wheel engageable with the side of a bale to measure the length thereof during formation, binding mechanism for securing said bale, means responsive to said measuring wheel for actuating said mechanism when a bale reaches a predetermined length, said means comprising a trip member biased toward the tripping position in which said mechanism is actuated, a pair of latch dogs biased for engagement with said trip member, a shaft turned by said wheel, a cam fixed to said shaft and engageable with one of said latch dogs to release the latter after the bale acquires a predetermined intermediate length, thereby permitting said trip member to be moved by its biasing means past said one latch dog into engagement with the other of said dogs, a second cam fixed to said shaft and engageable with said other dog to release the latter responsive to said bale acquiring a predetermined final length, thereby permitting said trip member to be moved by its biasing means into said tripping position, and means responsive to actuation of said mechanism for returning said trip member to its original position in latched engagement with said one dog.

14. In a baling press, a bale case having a feed opening in a wall thereof, a plunger reciprocable within said case, a pair of cooperable cutting tools shiftable relative to each other by power received from the movement of said plunger for cutting off material being fed through said opening, a measuring device for determining the size of the bale being formed, mechanism responsive to said measuring device and operative through a cycle for terminating the formation of one bale and initiating the formation of a succeeding bale, and means responsive to said mechanism for controlling said cutting tools and arranged to normally prevent said tools from cutting the material but operative to actuate said tools at the completion of a bale.

15. In a baling press, a bale case having a feed opening in a wall thereof, a plunger reciprocable within said case, a first cutting tool disposed along one side of said opening, a second cutting tool mounted on said plunger for movement therewith across said opening into cutting relation with said first tool for severing material being fed through said opening, one of said tools being shiftably mounted for movement between an active position in which it cooperates with the other tool upon movement of said plunger and a disabled position, a measuring device for determining the size of the bale being formed, mechanism responsive to said measuring device and operative through a cycle for terminating the formation of one bale and initiating the formation of a succeeding bale, and means responsive to said mechanism for controlling said shiftable tool and arranged to maintain the latter in disabled position to prevent severing the material during the formation of each bale but to cause said shiftable tool to be positioned in said active position at the completion of each bale.

16. In a baling press, a bale case having a feed opening in a wall thereof, a plunger reciprocable within said case, a first cutting tool disposed along one side of said opening, a second cutting tool mounted on said plunger for movement therewith across said opening into cutting relation with said first tool for severing material being fed through said opening, one of said tools being shiftably mounted for movement between an active position in which it cooperates with the other tool upon movement of said plunger and a disabled position, a measuring device for determining the size of the bale being formed, mechanism responsive to said measuring device and operative through a cycle for terminating the formation of one bale and initiating the formation of a succeeding bale, means responsive to said mechanism for controlling said shiftable tool comprising means actuated by said plunger for shifting said shiftable tool to disabled position during each compression stroke of the plunger and returning the tool to active position during each return stroke of the plunger, and means actuated by said bale terminating mechanism for disabling said tool shifting means during the bale terminating cycle, thereby positioning said shiftable tool in active cutting position to sever the material.

17. In a baling press, a bale case having a feed opening in a wall thereof, a plunger reciprocable within said case, a first cutting tool disposed along one side of said opening, a second cutting tool mounted on said plunger for movement therewith across said opening into cutting relation with said first tool for severing material being fed through said opening, said first cutting tool being mounted on said bale case by means providing for shifting movement between an active cutting position in which it cooperates with said second tool upon movement of the plunger and a disabled position in which it is spaced away from the plane of movement of said plunger mounted cutting tool, a measuring device for determining the size of the bale being formed, mechanism responsive to said measuring device and operative through a cycle for terminating the formation of one bale and initiating the formation of a succeeding bale, means responsive to said mechanism for controlling said shiftable tool comprising resilient means urging the latter toward said active position, means engageable by said plunger during each compression stroke for shifting said first tool to said disabled position, and means responsive to actuation of said bale terminating mechanism for disabling said tool shifting means.

GEORGE B. HILL.

REFERENCES CITED

The following references are of record in the file of this patent:

UNITED STATES PATENTS

| Number | Name | Date |
| --- | --- | --- |
| 284,686 | Thorne | Sept. 11, 1883 |
| 881,432 | Miller | Mar. 10, 1908 |
| 947,039 | Hart | Jan. 18, 1910 |
| 1,028,404 | Trabue | June 4, 1912 |
| 1,053,397 | Jackson | Feb. 18, 1913 |
| 1,075,376 | Pearson et al. | Oct. 14, 1913 |
| 1,305,344 | Dudley | June 3, 1919 |
| 1,756,988 | Nichols | May 6, 1930 |
| 1,830,623 | Rollman | Nov. 3, 1931 |
| 1,863,648 | Bernard | June 21, 1932 |
| 2,097,353 | Tallman et al. | Oct. 26, 1937 |
| 2,293,679 | Barker | Aug. 18, 1942 |
| 2,318,229 | Jones | May 4, 1943 |
| 2,446,878 | Kaupke et al. | Aug. 10, 1948 |
| 2,450,082 | Crumb et al. | Sept. 28, 1948 |

FOREIGN PATENTS

| Number | Country | Date |
| --- | --- | --- |
| 12,751 | Denmark | Nov. 26, 1909 |